(12) United States Patent
Kaushik et al.

(10) Patent No.: US 9,519,568 B2
(45) Date of Patent: Dec. 13, 2016

(54) SYSTEM AND METHOD FOR DEBUGGING AN EXECUTING GENERAL-PURPOSE COMPUTING ON GRAPHICS PROCESSING UNITS (GPGPU) APPLICATION

(71) Applicant: NVIDIA Corporation, Santa Clara, CA (US)

(72) Inventors: Mayank Kaushik, Santa Clara, CA (US); Alban Douillet, Cupertino, CA (US); Geoffrey Gerfin, Sunnyvale, CA (US); Vyas Venkataraman, Santa Clara, CA (US); Mark Hairgrove, San Jose, CA (US); Riley Andrews, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/732,282

(22) Filed: Dec. 31, 2012

(65) Prior Publication Data
US 2014/0189647 A1   Jul. 3, 2014

(51) Int. Cl.
*G06F 9/44* (2006.01)
*G06F 11/36* (2006.01)

(52) U.S. Cl.
CPC ....... *G06F 11/3636* (2013.01); *G06F 11/3624* (2013.01)

(58) Field of Classification Search
CPC .................. G06F 11/3688; G06F 11/3664
USPC ................... 717/124, 128, 129, 131
See application file for complete search history.

(56) References Cited

U.S. PATENT DOCUMENTS

| | | | |
|---|---|---|---|
| 5,752,062 A | 5/1998 | Gover et al. | |
| 5,757,919 A | 5/1998 | Herbert et al. | |
| 5,815,154 A | 9/1998 | Hirschtick et al. | |
| 5,960,199 A * | 9/1999 | Brodsky et al. | 717/128 |
| 5,978,484 A | 11/1999 | Apperson et al. | |
| 6,044,475 A * | 3/2000 | Chung et al. | 714/15 |
| 6,282,701 B1 | 8/2001 | Wygodny et al. | |

(Continued)

OTHER PUBLICATIONS

Coutinho et al., "Performance Debugging of GPGPU Applications with the Divergence Map", Jun. 7, 2010.*

(Continued)

*Primary Examiner* — Phillip H Nguyen (57) ABSTRACT

A system and method for debugging an executing program. The method includes executing a general-purpose computing on graphics processing units (GPGPU) program. The GPGPU program comprises a first portion operable to execute on a central processing unit (CPU) and a second portion operable to execute on a graphics processing unit (GPU). The method further includes attaching a debugging program to the first portion of the GPGPU program and modifying the first portion of the GPGPU program. The attaching of the debugging program to the first portion of the GPGPU program pauses execution of the first portion of the GPGPU program. The method further includes resuming execution of the first portion of the GPGPU program and accessing a first state information corresponding to the first portion of the GPGPU program. Execution of the first portion of the GPGPU program may then be paused. The first state information may then be used to access a second state information corresponding to the second portion of the GPGPU program.

20 Claims, 9 Drawing Sheets

(56) References Cited

U.S. PATENT DOCUMENTS

| | | | |
|---|---|---|---|
| 6,314,470 B1* | 11/2001 | Ward et al. | 719/328 |
| 6,330,008 B1 | 12/2001 | Razdow et al. | |
| 6,362,825 B1 | 3/2002 | Johnson | |
| 6,668,325 B1 | 12/2003 | Collberg et al. | |
| 6,721,941 B1* | 4/2004 | Morshed et al. | 717/127 |
| 6,732,060 B1 | 5/2004 | Lee | |
| 6,901,582 B1 | 5/2005 | Harrison | |
| 7,047,519 B2 | 5/2006 | Bates et al. | |
| 7,065,634 B2* | 6/2006 | Lewis et al. | 712/227 |
| 7,107,484 B2 | 9/2006 | Yamazaki et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,395,426 B2 | 7/2008 | Lee et al. | |
| 7,505,953 B2 | 3/2009 | Doshi | |
| 7,555,499 B2 | 6/2009 | Shah et al. | |
| 7,600,155 B1* | 10/2009 | Nickolls | G06F 11/36 714/38.13 |
| 7,739,667 B2 | 6/2010 | Callahan, II et al. | |
| 8,203,558 B2* | 6/2012 | Abbas | 345/426 |
| 8,255,203 B2* | 8/2012 | George et al. | 703/28 |
| 8,276,124 B2 | 9/2012 | Maennel | |
| 8,429,632 B1* | 4/2013 | Coutant et al. | 717/151 |
| 8,436,864 B2 | 5/2013 | Aguaviva et al. | |
| 8,436,870 B1 | 5/2013 | Aguaviva et al. | |
| 8,448,002 B2 | 5/2013 | Bulusu et al. | |
| 8,452,981 B1 | 5/2013 | Kiel et al. | |
| 8,566,647 B2* | 10/2013 | Maybee | G06F 11/323 714/38.1 |
| 8,607,151 B2 | 12/2013 | Aguaviva et al. | |
| 8,639,984 B2* | 1/2014 | McNeeney | 714/38.1 |
| 2001/0027387 A1* | 10/2001 | Miyake et al. | 703/22 |
| 2001/0044928 A1 | 11/2001 | Akaike et al. | |
| 2002/0157086 A1 | 10/2002 | Lewis et al. | |
| 2003/0043022 A1 | 3/2003 | Burgan et al. | |
| 2003/0214660 A1 | 11/2003 | Plass et al. | |
| 2004/0085894 A1 | 5/2004 | Wang et al. | |
| 2005/0022167 A1* | 1/2005 | Gryko et al. | 717/124 |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0080625 A1 | 4/2006 | Bose et al. | |
| 2006/0109846 A1 | 5/2006 | Lioy et al. | |
| 2006/0152509 A1 | 7/2006 | Heirich | |
| 2006/0161761 A1 | 7/2006 | Schwartz et al. | |
| 2006/0185017 A1 | 8/2006 | Challener et al. | |
| 2006/0242627 A1 | 10/2006 | Wygodny et al. | |
| 2007/0115292 A1 | 5/2007 | Brothers et al. | |
| 2007/0274284 A1 | 11/2007 | Dendukuri et al. | |
| 2008/0007563 A1 | 1/2008 | Aronson et al. | |
| 2008/0034351 A1 | 2/2008 | Pugh et al. | |
| 2008/0095090 A1 | 4/2008 | Lee et al. | |
| 2008/0098207 A1 | 4/2008 | Reid et al. | |
| 2008/0162272 A1 | 7/2008 | Huang et al. | |
| 2009/0031290 A1 | 1/2009 | Feng et al. | |
| 2009/0037774 A1* | 2/2009 | Rideout et al. | 714/38 |
| 2009/0307660 A1 | 12/2009 | Srinivasan | |
| 2010/0242025 A1 | 9/2010 | Yamazaki et al. | |
| 2011/0078427 A1* | 3/2011 | Shebanow et al. | 712/244 |
| 2012/0151183 A1 | 6/2012 | Guilford et al. | |
| 2012/0159261 A1* | 6/2012 | Maybee et al. | 714/38.13 |
| 2012/0185730 A1 | 7/2012 | Moran et al. | |
| 2013/0091493 A1* | 4/2013 | Sowerby et al. | 717/125 |
| 2013/0091494 A1* | 4/2013 | Sowerby et al. | 717/129 |
| 2013/0297978 A1 | 11/2013 | Jalbert et al. | |
| 2013/0332906 A1 | 12/2013 | Razavi et al. | |
| 2014/0019984 A1 | 1/2014 | Li et al. | |
| 2014/0366006 A1 | 12/2014 | Gottschlich et al. | |

OTHER PUBLICATIONS

C. Cebenoyan and M. Wloka, "optimizing the graphics pipeline", 2003, Nvidia GDC Presentation Slide.

gDEBugger, graphicREMEDY, http://www.gremedy.com/, Jul. 29, 2005.

"maxVUE Graphic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

"ATI Radeon X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006).

N. Tatarchuk, "New RenderMonkey Features for DirectX and OpenGL Shader Development", Game Developers Conference, Mar. 2004.

GPU Performance Optimization with NVPerfHUD. NVPerfHUD 4.0. A Heads-Up Display for Performance Analysis. NIVIDIA Corporation, May 2006, Downloaded on Aug. 24, 2012 in archive.org under the following URL associated with a capture of Jul. 20, 2006: http://weg.archive.org/weg/20060720222056/http://developer.nvidia.com/object/nvperfhud_home.html.

Kiel, J. [et al.]: NVIDIA Performance Tools. Slides presented during the lecture given on the occasion of the Game Developers Conference in Mar. 2006, Downloaded on Aug. 28, 2012 in archive.org under the following URL associated with a capture of May 26, 2006: http://web.archive.org/web/20060526023128/http://download.nvidia.com/developer/presentations/2006/gdc/2006-GDC-Performance-Tools.pdf.

Online-Information on NVPerfHUD 4 in archive.org dated Jul. 20, 2006, URL: http://web.archive.org/web/20060720222056/http://developer.nvidia.com/object/nvperfhud_home.html, [search carried out on Aug. 24, 2012].

Entry on Wikipedia dated Oct. 7, 2006 regarding the term "Debugger", URL:http://en.wikipedia.org/w/index.php?title=Debugger&oldid=63069774, [search carried out on Aug. 27, 2012].

* cited by examiner

SYSTEM AND METHOD FOR DEBUGGING AN EXECUTING GENERAL-PURPOSE COMPUTING ON GRAPHICS PROCESSING UNITS (GPGPU) APPLICATION

FIELD OF THE INVENTION

Embodiments of the present invention are generally related to general-purpose computing on graphics processing units (GPGPU) programming and debugging.

BACKGROUND OF THE INVENTION

As computer systems have advanced, graphics processing units (GPUs) have become increasingly advanced both in complexity and computing power. As a result of this increase in processing power, GPUs are now capable of executing both graphics processing and more general computing tasks.

The ability to execute general computing tasks on a GPU has lead to increased development of programs that execute general computing tasks on a GPU and the corresponding need to be able to debug tasks executing on the GPU. A GPGPU program executing general computing tasks on a GPU has a host portion executing on a central processing unit (CPU) and a device portion executing on the GPU. With conventional solutions, it is not possible to access data for debugging of both the host or CPU side of the program and the device or GPU side of an already executing GPGPU program.

Conventional solutions can provide access to the device or GPU portion of the GPGPU program if the GPGPU program is started from within a debugger. Unfortunately, starting the program within the debugger affects the program's behavior because of state collection during the execution of the CPU and GPU sides of the GPGPU program. The impact of starting the program within the debugger thus makes bugs that depend on a particular order of thread execution, known as race conditions, potentially unobservable. This can make debugging particularly challenging. Further, executing the GPGPU program within the debugger negatively impact performances and slows execution of the program.

SUMMARY OF THE INVENTION

Accordingly, what is needed is a solution to allow debugging of an executing GPGPU program without negatively impacting performance while allowing indeterminate and race conditions to be observable and thereby debuggable. Embodiments of the present invention are operable to attach and detach a debugger program from an executing GPGPU program without modifying the behavior or performance of the GPGPU program. Embodiments of the present invention are operable to pause or stop (e.g., asynchronously) a GPGPU program execution on a CPU and a GPU and examine corresponding state information (e.g., GPU memory, registers, barriers, etc.). Advantageously, embodiments of the present invention are operable to pause the GPGPU process without affecting performance of the program such that the performance of GPU threads are unchanged up to the point of the pausing of the GPGPU process. Embodiments of the present invention thereby allow debugging of the GPU portion of a GPGPU program. Embodiments of the present invention further allow a GPGPU program to execute for long periods of time (e.g., hours, days, weeks, months, or years) before pausing the already executing GPGPU program and examining CPU state and GPU state without modifying program behavior.

In one embodiment, the present invention is directed to a method for debugging an executing program. The method includes executing a general-purpose computing on graphics processing units (GPGPU) program. The GPGPU program comprises a first portion operable to execute on a central processing unit (CPU) and a second portion operable to execute on a graphics processing unit (GPU). The method further includes attaching a debugging program to the first portion of the GPGPU program and modifying the first portion of the GPGPU program. In one embodiment, the modifying comprises adding a function call to a memory stack of the first portion of the GPGPU program. The attaching of the debugging program to the first portion of the GPGPU program pauses execution of the first portion of the GPGPU program. The method further includes resuming execution of the first portion of the GPGPU program and accessing a first state information corresponding to the first portion of the GPGPU program. In one exemplary embodiment, a function call is executed on the memory stack of the application upon resuming execution. Execution of the first portion of the GPGPU program may then be paused again. The first state information may then be used to access a second state information corresponding to the second portion of the GPGPU program. The first state information may be CPU state information of the first portion of the GPGPU program. The second state information may be GPU state information of the second portion of the GPGPU program. The method may further include pausing execution of the second portion of the GPGPU program prior to accessing the second state information. In one embodiment, the method includes executing a debugging helper program operable to receive the first state information and the second state information from the GPGPU program.

In one embodiment, the present invention is directed toward a system for debugging an executing program. The system includes a CPU attachment module operable to attach to an executing CPU portion of a general-purpose computing on graphics processing units (GPGPU) program and a program modification module operable to modify execution of the CPU portion of the GPGPU program. In one embodiment, the program modification module is operable to modify a memory stack of the CPU portion of the GPGPU program. In one exemplary embodiment, the program modification module is operable to add a dynamic function call to the memory stack of the CPU portion of the GPGPU program. The system further includes an execution control module operable to control execution of the CPU portion of the GPGPU program and a GPU portion of the GPGPU program and a GPU access module operable to access GPU state information corresponding to the GPU portion of the GPGPU program. In one embodiment, the execution control module is operable to pause execution and resume execution of the CPU portion of the GPGPU program. The execution control module may be further operable to pause execution and resume execution of the GPU portion of the GPGPU program.

The system may further include a user interface module operable to display state information of the CPU portion of the GPGPU program and the GPU portion of the GPGPU program. The system may further include a state query module operable to send a request for state information of at least one of the CPU portion of the GPGPU program and the GPU portion of the GPGPU program. The program may further include a debugging helper module operable to access state information of the CPU portion of the GPGPU program and the GPU portion of the GPGPU program. In one embodiment, the debugging helper module is operable to signal the GPGPU program to collect state information of the CPU portion of the GPGPU program.

In another embodiment, the present invention is implemented as a method for debugging an executing general-purpose computing on graphics processing units (GPGPU) program. The method includes receiving a request to detach a debugging program from the GPGPU program and sending a signal to the GPGPU program. In one embodiment, in response to the request to detach, a message is sent to a debugging helper program. In one exemplary embodiment, the sending of the signal is performed by a debugging helper program. The signal may be sent to a CPU portion of the GPGPU program. The method further includes resuming execution of the GPGPU program and in response to the signal the GPGPU program closes a communication channel with a debugging application.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

General-purpose computing on graphics processing units (GPGPU) programs or applications may be designed or written with the Compute Unified Device Architecture (CUDA) framework and Open Computing Language (OpenCL) framework. A GPGPU program may be referred to a CUDA or OpenCL program or application.

Computer System Environment

Figure 1:
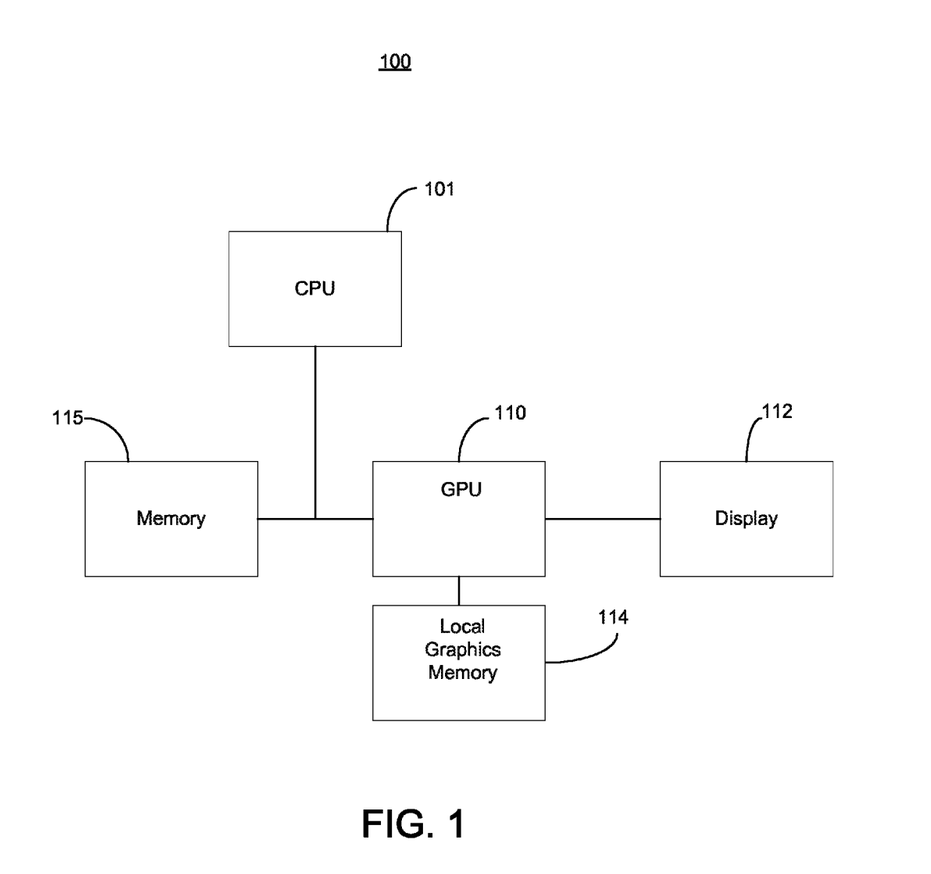
FIG. 1 shows a computer system in accordance with one embodiment of the present invention.

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

In one exemplary embodiment, GPU 110 is operable for General-purpose computing on graphics processing units (GPGPU) computing. GPU 110 may execute Compute Unified Device Architecture (CUDA) programs and Open Computing Language (OpenCL) programs. It is appreciated that the parallel architecture of GPU 110 may have significant performance advantages over CPU 101.

Exemplary Systems and Methods for Debugging an Executing General-Purpose Computing on Graphics Processing Units (GPGPU) Application Embodiments of the present invention are operable to attach and detach a debugger program from an executing GPGPU program without modifying the behavior or performance of the GPGPU program up to the point when the debugger is attached. Embodiments of the present invention are operable to pause or stop (e.g., asynchronously) a GPGPU program execution on a CPU and a GPU and examine corresponding state information (e.g., GPU memory, registers, barriers, etc.). Advantageously, embodiments of the present invention are operable to pause the GPGPU process without affecting performance of the program such that the performance of GPU threads are unchanged up to the point of the pausing of the GPGPU process. Embodiments of the present invention thereby allow debugging of the GPU portion of a GPGPU program. Embodiments of the present invention further allow a GPGPU program to execute for long periods of time (e.g., hours, days, weeks, months, or years) before pausing the already executing GPGPU program and examining CPU state and GPU state without modifying program behavior.

Figure 2:
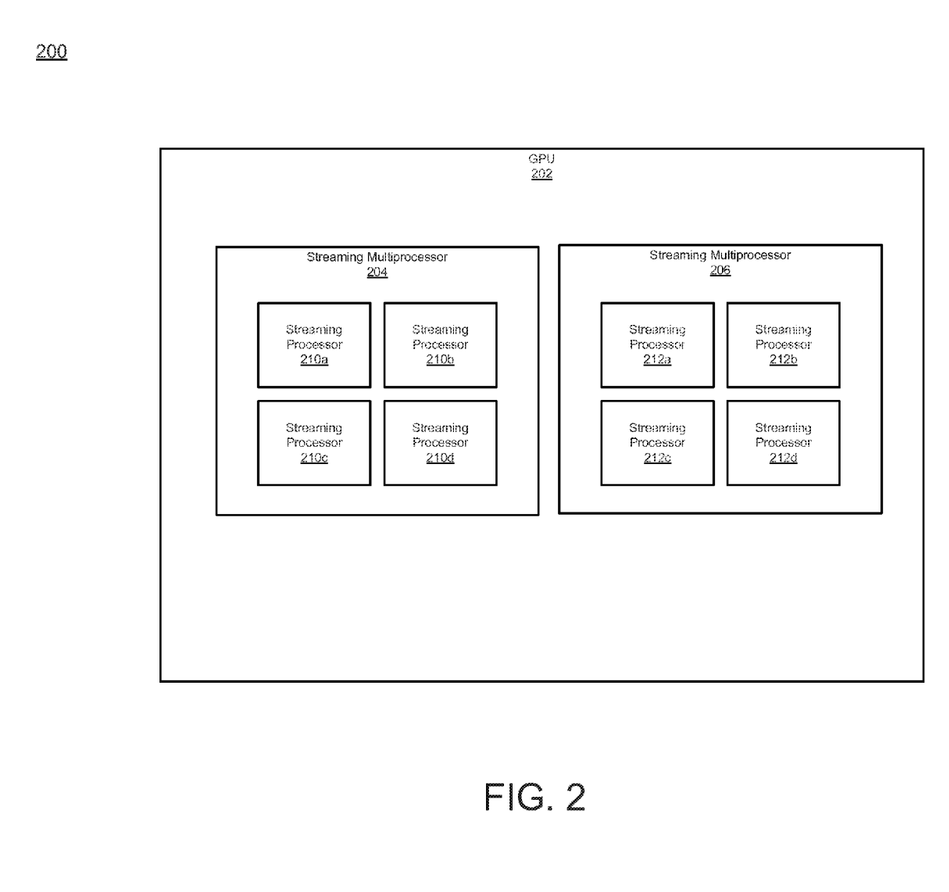
FIG. 2 shows a block diagram of exemplary components of a graphics processing unit (GPU) in accordance with one embodiment of the present invention.
Figure 3:
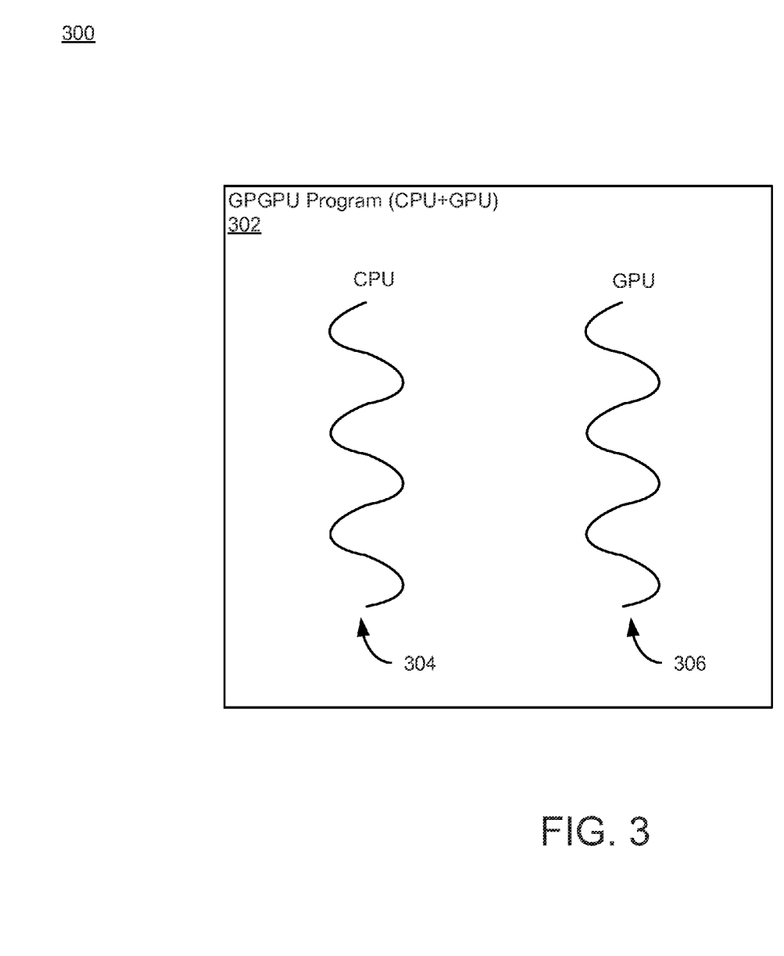
FIG. 3 shows exemplary components of general-purpose computing on graphics processing units (GPGPU) program in accordance with one embodiment of the present invention.
Figure 4:
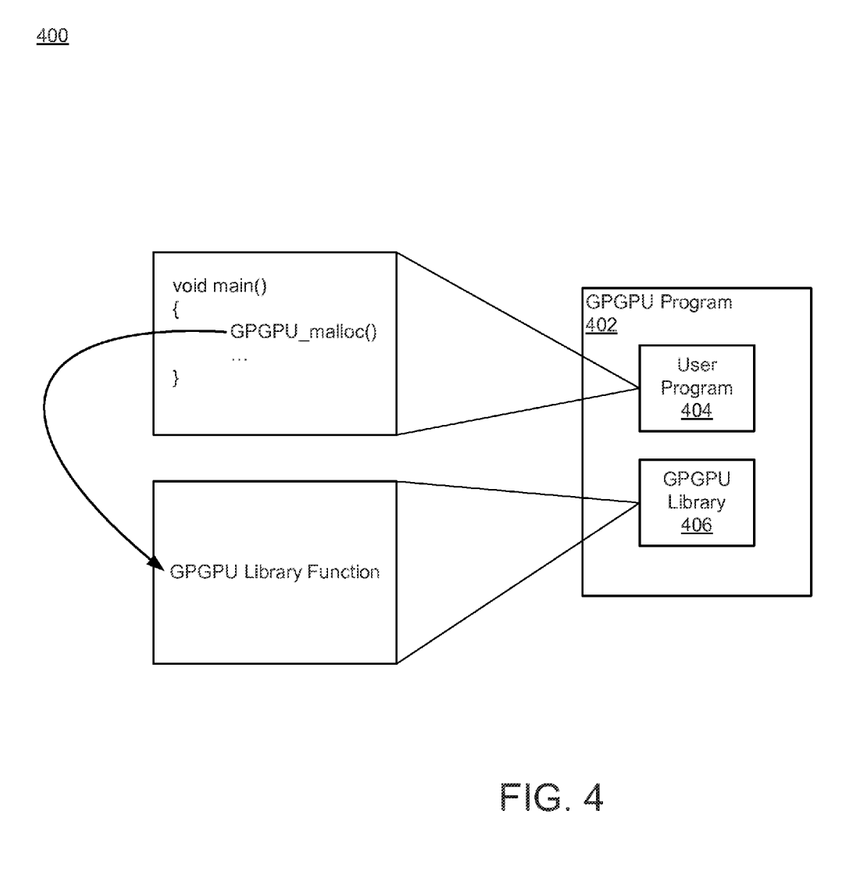
FIG. 4 shows a block diagram of exemplary computer-executable code portions of a GPGPU in accordance with one embodiment of the present invention.

FIGS. 2-4 illustrate example components used by various embodiments of the present invention. Although specific components are disclosed in systems 200-400, it should be appreciated that such components are examples. That is, embodiments of the present invention are well suited to having various other components or variations of the components recited in systems 200-400. It is appreciated that the components in systems 200-400 may operate with other components than those presented, and that not all of the components of systems 200-400 may be required to achieve the goals of systems 200-400.

FIG. 2 shows a block diagram of exemplary components of a graphics processing unit (GPU) in accordance with one embodiment of the present invention. FIG. 2 depicts an exemplary GPU and exemplary execution units of the GPU. GPU 202 includes streaming multiprocessors 204-206. It is noted that a GPU in accordance with embodiments of the present invention may have any number of streaming multiprocessors and it not limited to two streaming multiprocessors.

Streaming multiprocessor 204 includes streaming processors 210*a-d*. Streaming multiprocessor 206 includes streaming processor 212*a-d*. Streaming processor 210*a-d* and 212*a-d* are executions unit operable to execution functions and computations for graphics processing or general computing tasks. Each of streaming processors 210*a-d* and 212*a-d* may have respective context or state information that may be accessed by embodiments of the present invention.

Each of streaming multiprocessors 204-206 may be assigned to execute a plurality of threads. For example, streaming multiprocessor 204 may be assigned a first 1000 threads and streaming multiprocessor 206 may be assigned a second 1000 threads.

FIG. 3 shows exemplary components of general-purpose computing on graphics processing units (GPGPU) program in accordance with one embodiment of the present invention. FIG. 3 depicts a general-purpose computing on graphics processing units (GPGPU) program having a first portion operable to execute on a central processing unit (CPU) and second portion operable to execute on a GPU.

GPGPU program 302 includes CPU thread 304 operable to execute on a CPU and GPU thread 306 operable to execute on a GPU. GPGPU program 302 may have a corresponding process identifier (PID) which uniquely identifies GPGPU program 302 to an operating system. The PID of GPGPU program 302 may thus be used to identify the program and request that a debugger attach to the GPGPU program 302. In one embodiment, the PID of GPGPU program 302 is used to attach a debugger to the portion of GPGPU program 302 executing on a CPU. For example, a debugger may present a prompt allowing a user to enter the PID of GPGPU program 302 and in response the debugger attaches to the CPU portion of GPGPU program 302. When the debugger attaches to the GPU portion of GPGPU program 302, execution of GPGPU program 302 may be paused.

FIG. 4 shows a block diagram of exemplary computer-executable code portions of a GPGPU in accordance with one embodiment of the present invention. FIG. 4 depicts an exemplary configuration of GPGPU program 402 and corresponding exemplary functions.

GPGPU program 402 includes user program 404 and GPGPU library 406. User program 404 may include a portion operable to execute on a CPU (e.g., one or more CPU threads) and a portion operable to execute on a GPU (e.g., one or more GPU threads). GPGPU library 406 is operable to invoke execution of functions of a GPU. In one exemplary embodiment, user program 404 comprises a portion operable to execute on a CPU that includes a GPGPU_malloc( ) function call which calls a function of GPGPU library 406 which is operable to allocate memory for work to be performed by a GPU. GPGPU library 406 may call the GPU device driver to implement the GPGPU library 406 function call.

In one embodiment, GPGPU library 406 is a GPGPU driver (e.g., CUDA driver). The GPGPU driver may have a thread for each context which waits for events from a GPU device driver. The thread may also be operable to wait on a particular signal or predetermined file descriptor that is for debugging and/or pausing execution on the GPU. The GPGPU driver may not store additional state information for the GPGPU debugger thereby ensuring that program behavior is not altered (e.g., race conditions hidden). A GPGPU trap handler operable to pause execution of the GPU may be downloaded to the GPU and kept in a dormant state until needed for debugging.

Figure 5:
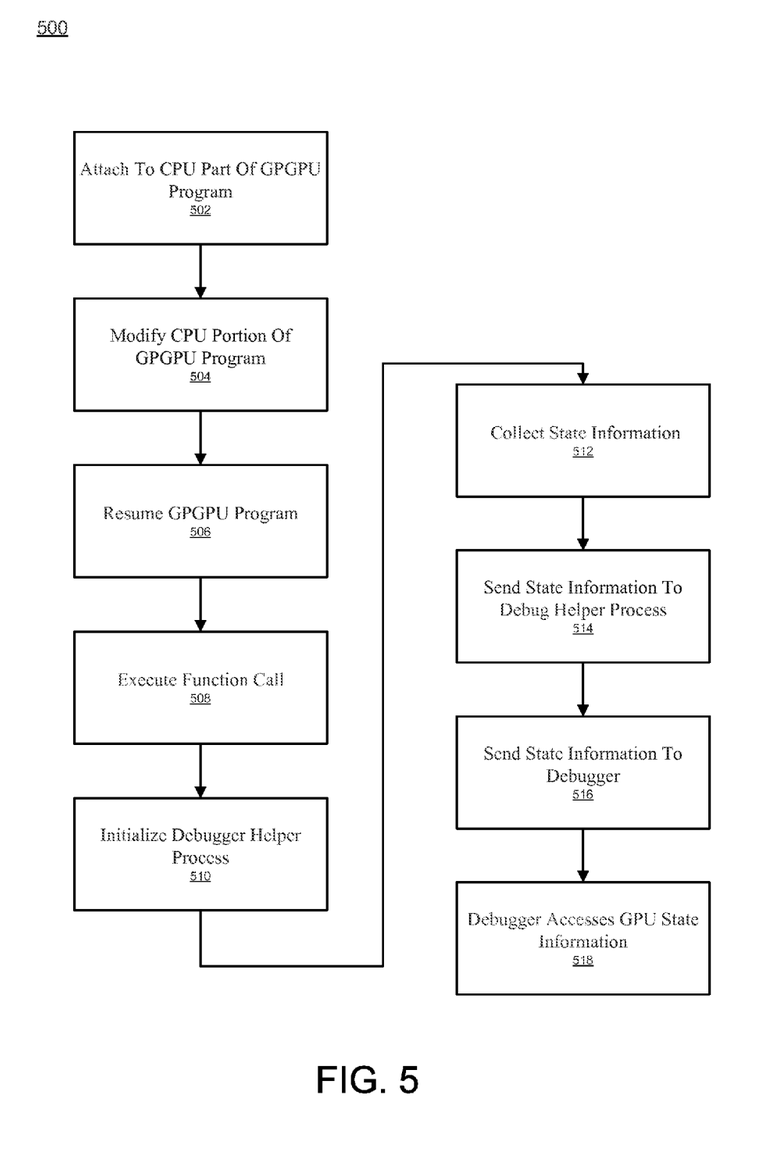
FIG. 5 shows a flowchart of an exemplary computer controlled process for attaching a debugger to an executing GPGPU program in accordance with one embodiment of the present invention.
Figure 8:
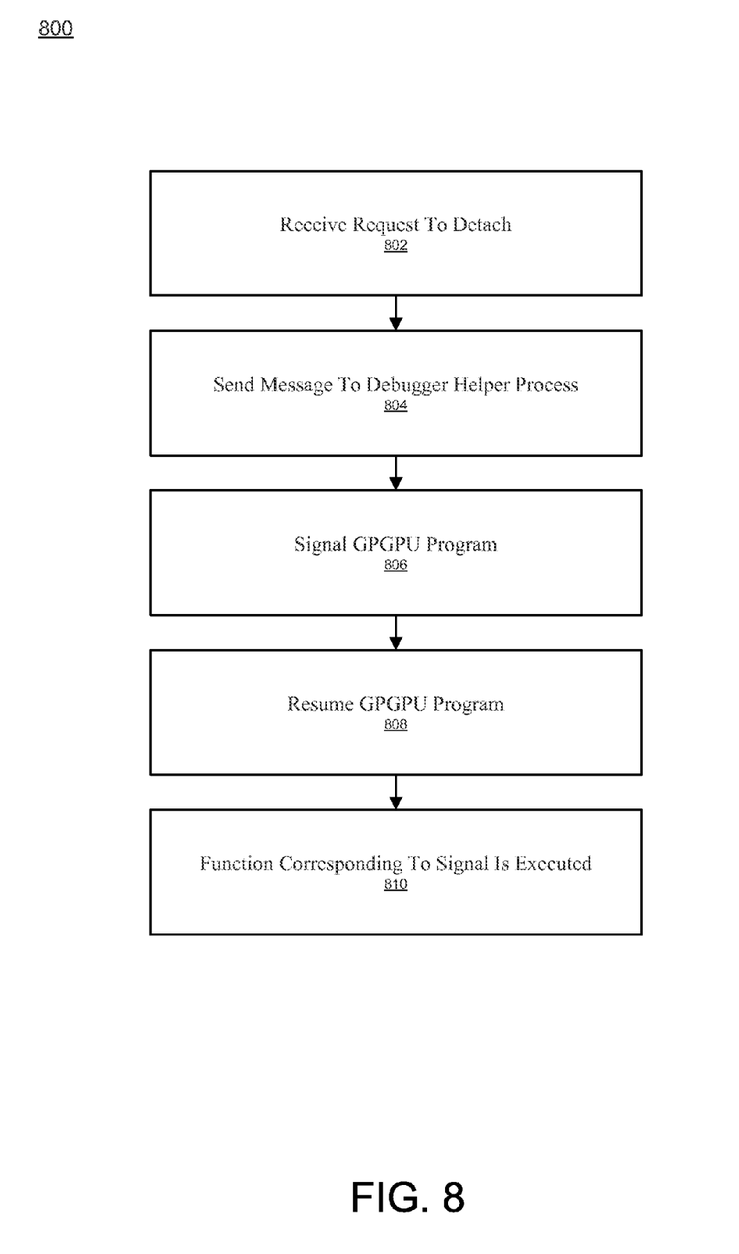
FIG. 8 shows a flowchart of an exemplary computer controlled process for detaching a debugger from a GPGPU program in accordance with one embodiment of the present invention

With reference to FIGS. 5 and 8, flowcharts 500 and 800 illustrate example functions used by various embodiments of the present invention for debugging including attaching and detaching from a GPGPU program. Although specific function blocks ("blocks") are disclosed in flowcharts 500 and 800, such steps are examples. That is, embodiments are well suited to performing various other blocks or variations of the blocks recited in flowcharts 500 and 800. It is appreciated that the blocks in flowcharts 500 and 800 may be performed in an order different than presented, and that not all of the blocks in flowcharts 500 and 800 may be performed.

FIG. 5 shows a flowchart of an exemplary computer controlled process for attaching a debugger to an executing GPGPU program in accordance with one embodiment of the present invention. FIG. 5 depicts a process for attaching a debugger to an executing GPGPU program and collecting state information of a CPU and a GPU. It is noted that the attachment process 500 does not have an effect on the state of the GPGPU application until the point of attachment which is important for allowing race conditions to be observed and debugged.

It is noted that on the CPU side, a debugger can attach to an application process using ptrace( ) functionality, however, with conventional solutions there is no support for attaching to GPGPU threads running on a GPU without modifying the behavior of the running application from an early stage, potentially hiding race conditions. The ptrace( ) functionality cannot be conventionally implemented by trying to port ptrace( ) over to the GPU. Embodiments of the present invention are operable instead to attach to the CPU part of a GPGPU application, collect GPU state information via the GPGPU driver, and send the GPU state information to the GPGPU debugger. The GPU state information can then be used to determine the location of code memory, user parameters, etc. on the GPU. Embodiments of the present invention are further operable to allow pausing of the GPGPU program without needing to set any environment variables.

Referring to FIG. 5, at block 502, the debugger attaches to the CPU part of the GPGPU program. In response to attachment to the CPU part of the GPGPU program, the CPU portion of the GPGPU program is frozen, halted, or paused. In one embodiment, the CPU part of the GPGPU program is attached to via the ptrace( ) API. The GPGPU program may be paused or halted in response to the request via ptrace ( ).

At block 504, the CPU portion of GPGPU program is modified. In one embodiment, a function call (e.g., dynamic function call) is added to the top of the memory stack of the CPU part of the GPGPU program.

At block 506, the CPU portion of the GPGPU program is resumed. In one embodiment, the debugger application unpauses the GPGPU application.

Figure 7:
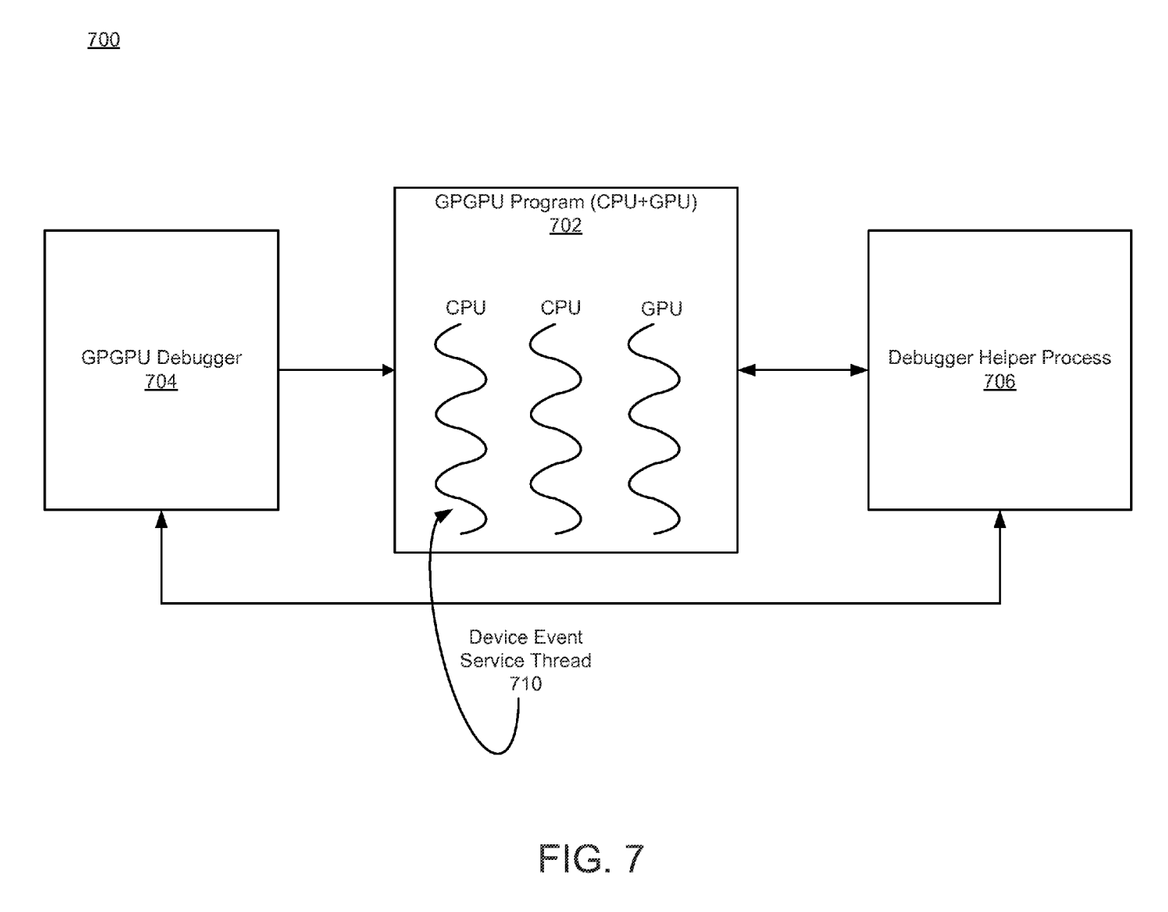
FIG. 7 shows an exemplary dataflow diagram of a GPGPU debugger and a GPGPU program in accordance with one embodiment of the present invention.

At block 508, the function call is executed (e.g., by the CPU). The function call added to the memory stack may be executed in response to resuming of execution (e.g., execution of the CPU portion of the GPGPU program). In one embodiment, the function call sends a signal to a thread (e.g., device event service thread 710) operable to invoke state collection (e.g., CPU state information collection). The execution of CPU portion of the GPGPU program may then be paused.

At block 510, a debugger helper process is initialized or executed. The execution of CPU portion of the GPGPU program may then be paused. In one embodiment, the debugger helper process is executed in response to the function call (e.g., the function forks off the debugger helper process). In one embodiment, the debugging helper program is operable to receive CPU state information and GPU state information from the GPGPU program.

In another embodiment, the debugger helper process is launched while the CPU portion of the GPGPU program is paused and the debugger helper process sends a signal to the CPU portion of the GPGPU program to invoke the state collection function. The GPGPU application then accesses the signal from the debugger helper process and executes a special callback to collect GPU information in response to the signal from the debugger helper process.

At block 512, state information is collected. In one embodiment, in response to the signal from the function call (e.g., dynamic function call), the CPU part of the GPGPU program collects state information about the CPU portion of the GPGPU program. The function call or callback may access the CPU portion of the GPGPU program and the GPGPU driver to collect state information about that GPU program being executed by the GPU, where in GPU memory the GPU program is stored, and details about the kernels executing on the execution units of the GPU (e.g., streaming multiprocessors), etc.

At block 514, the state information (e.g., CPU state information) is sent to the debugger help process.

At block 516, the state information (e.g., CPU state information) is sent to the debugger. In one embodiment, the debugger helper process sends the state information to the debugger.

At block 518, the debugger accesses GPU state information. The debugger may access GPU state information based on the CPU state information. In one embodiment, the debugger pauses or halts the GPU (e.g., pause each of the stream multiprocessors of the GPU) and examines the state of each thread executing on the GPU. The CPU and GPU state information may then be presented to a user.

Figure 6:
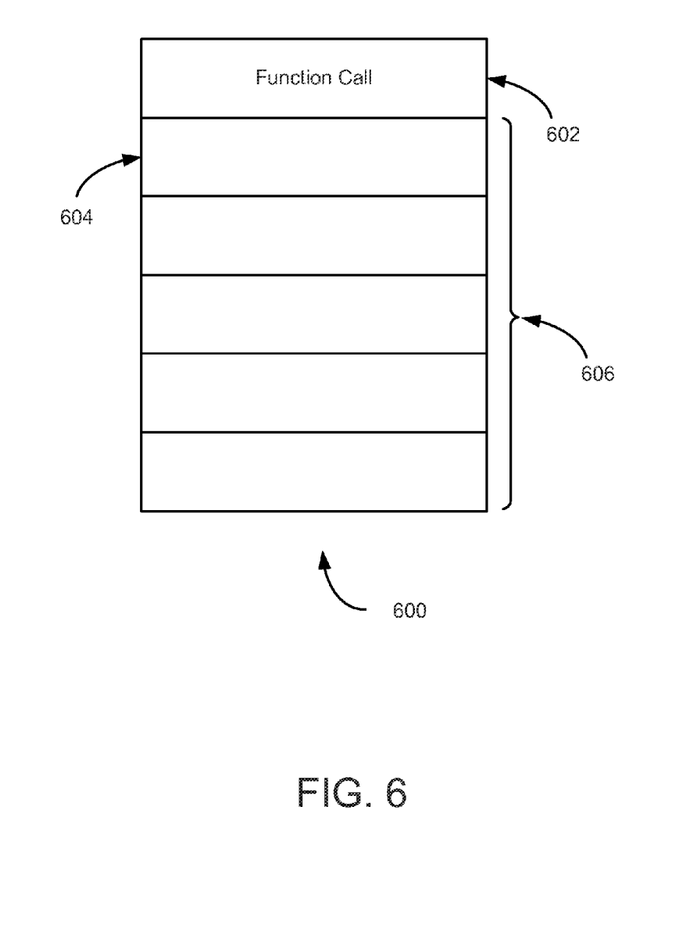
FIG. 6 shows an exemplary GPGPU program stack during attachment of a debugger to the executing GPGPU program in accordance with one embodiment of the present invention.

FIG. 6 shows an exemplary GPGPU program stack during attachment of a debugger to the executing GPGPU program in accordance with one embodiment of the present invention. FIG. 6 depicts an exemplary stack of a CPU portion of a GPGPU program during the attachment process of a debugger. After attachment, the debugger can detach from the GPU and CPU side of the GPGPU application. The GPGPU application can then continue execution on both the GPU and CPU as before attachment. Embodiments of the present invention allow the debugger to attach and detach to the GPU and CPU sides of the GPGPU program as many times as desired without altering execution of the GPGPU program when the debugger is detached.

Stack 600 includes instructions 606, added frame 602, and top of stack 604. Instructions 606 correspond the CPU portion of a GPGPU program. Top of stack 604 is the top of the stack of CPU portion of the GPGPU program prior to the modification of the stack 600 after or during attachment of a debugger to the CPU portion of the GPGPU program. Added frame 602 is executed dynamically from stack 600 upon resuming execution of the GPGPU program. Added frame 602 may comprise a function operable to fork off the debugger helper process. In one embodiment, the executing of the dynamic function call modifies the state of the CPU side of the GPGPU program.

FIG. 7 shows an exemplary dataflow diagram of a GPGPU debugger and a GPGPU program in accordance with one embodiment of the present invention. FIG. 7 depicts exemplary communication and dataflow between a debugger, debugger helper process and GPGPU program. In some embodiments, debugger helper process 706 may be integrated or otherwise part of GPGPU debugger 704. GPGPU program 702 comprises a portion that executes on a CPU and a portion that executes on GPU.

In one embodiment, GPGPU program 702 comprises device event service thread 710 that executes on a CPU and device event service thread 710 is started upon startup of the GPGPU program 702 which is used for getting device (e.g., GPU) events, etc. Device event service thread 710 is further operable to wait for a specific signal for attaching of a debugger to GPGPU program 702. The waiting of device event service thread 710 for a specific signal for attaching a debugger to GPGPU program 702 does not cause any change in the behavior of GPGPU program 702 (e.g., changes in timing which may hide race conditions).

In one exemplary embodiment, device event service thread 710 comprises a table with each row having a signal and a corresponding call back or function. For example, if signal one is received the corresponding function one will be executed based on the table and if signal two is received the corresponding function two will be executed based on the table. In one embodiment, the table comprises file descriptors (e.g., file descriptors used by POSIX operating systems or numbers that correspond to a file such that when an attempt is made to write to that file, a program that is waiting for something to be written to that file wakes up). Device event service thread 710 may have a file descriptor corresponding to respective functions for use in attaching and detaching a debugger from GPGPU program 702. Device event service thread 710 may thus wake up and execute a corresponding function (e.g., to collect state information or execute detachment functions) when something is written to a respective file descriptor for attachment or detaching of a debugger from GPGPU program 702.

Device event service thread 710 is operable to wait for a signal from a debugger helper process causing the CPU part of GPGPU program 702 to collect state information of the CPU part of GPGPU program 702. The state information may then be sent to GPGPU debugger 704.

GPGPU debugger 704 attaches to GPGPU program as described with respect to process 500. In one embodiment, GPGPU debugger 704 is based on GNU Debugger (GDB). GPGPU debugger 704 may provide a frontend or interface for a user to debug (e.g., access state information from) GPGPU program 702. A user may enter "attach PID" at a prompt displayed by GPGPU debugger 704 to attach to the CPU side of GPGPU program 702. In one embodiment, debugger helper process 706 is forked off of GPGPU program 702 in response to a function call after attachment of GPGPU debugger 704 to GPGPU program 702.

GPGPU debugger 704 is operable to modify (e.g., modify the execution stack) of GPGPU program 702 to invoke a function call (e.g., dynamic function call) which forks off debugger helper process 706, which sends a signal or file descriptor to device event service thread 710. Upon receiving the signal or file descriptor corresponding to attachment, collection of CPU state information of GPGPU program 702 is performed.

Debugger helper process 706 receives the state information (e.g., CPU state information) from GPGPU program 702. Based on the CPU state information, the GPU may be paused and GPU state information accessed. Debugger helper process 706 may store the state information from both the GPU and CPU executing GPGPU program 702. GPGPU debugger 704 may communicate with debugger helper process 706 to obtain the state of each thread executing on the GPU and the state of each thread executing on the CPU. In one embodiment, debugger helper process 706 comprises a copy of a GPGPU driver.

FIG. 8 shows a flowchart of an exemplary computer controlled process for detaching a debugger from a GPGPU program in accordance with one embodiment of the present invention. FIG. 8 depicts a process for detachment of a debugger and/or debugger helper process from a GPGPU program. It is noted that a GPGPU program is frozen or paused as a result of the attachment of the debugger (e.g., process 500).

At block 802, a request to detach is received. The request may be received by a debugger (e.g., GPGPU debugger 704) to detach from a GPGPU program (e.g., GPGPU program 702) via a user command (e.g., via a user interface or command prompt).

At block 804, a message is sent to a debugger helper process. In one embodiment, a request to detach is sent from the debugger (e.g., by GPGPU debugger 70 in response to a user command) to a debugger helper process (e.g., debugger helper process 706).

At block 806, the GPGPU program is signaled. In one embodiment, in response to the message from the debugger, the debugger helper process sends a detachment signal (e.g., writes to a file descriptor that will invoke a detachment function) to the GPGPU program (e.g., the CPU portion of the GPGPU program).

At block 808, the GPGPU program is resumed. Upon the GPGPU program resuming the GPGPU application receives the signal (e.g., detachment signal or file descriptor).

At block 810, a function corresponding to the signal sent to the GPGPU program is executed. The function executed in response to the signal may close communication channels between GPGPU program (e.g., GPGPU program 702) and debugger helper process (e.g., debugger helping process 706). The function may further shutdown a debugger helper process (e.g., debugger helper process 706). The GPGPU program (e.g., GPGPU program 702) can then execute in the same manner as before attachment and detachment, and timing problems (e.g., indeterminate and race conditions) will be visible.

In one embodiment, an environment variable or other environment configuration may be set so that when the GPU portion of a GPGPU program encounters an error (e.g., in response to an unallowed memory access), the GPU portion of the GPGPU program is halted or paused instead of terminating. Debugger attachment and detachment processes (e.g., process 500 and 800) may be used to access state information of the CPU and GPU portions of the GPGPU program thereby allowing debugging and analysis of the GPGPU program.

Figure 9:
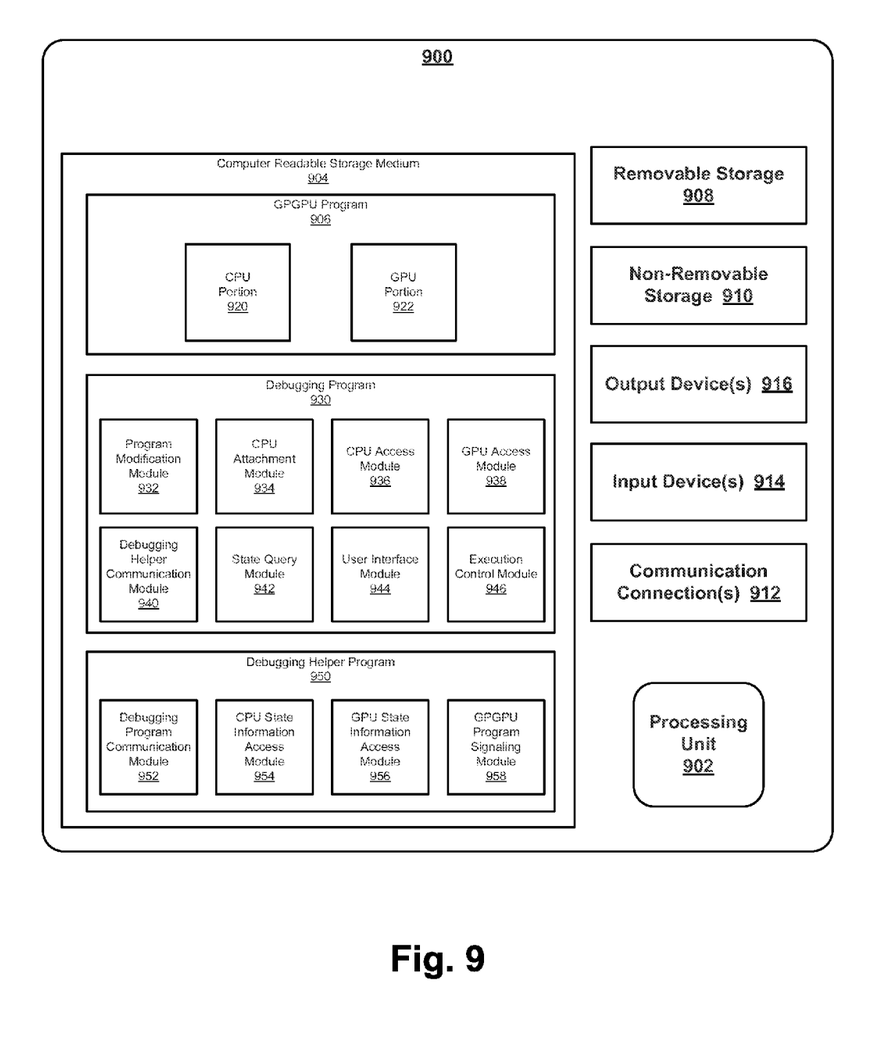
FIG. 9 shows a block diagram of exemplary computer system and corresponding modules, in accordance with one embodiment of the present invention.

FIG. 9 illustrates exemplary components used by various embodiments of the present invention. Although specific components are disclosed in computing system environment 900, it should be appreciated that such components are examples. That is, embodiments of the present invention are well suited to having various other components or variations of the components recited in computing system environment 900. It is appreciated that the components in computing system environment 900 may operate with other components than those presented, and that not all of the components of system 900 may be required to achieve the goals of computing system environment 900.

FIG. 9 shows a block diagram of exemplary computer system and corresponding modules, in accordance with one embodiment of the present invention. With reference to FIG. 9, an exemplary system module for implementing embodiments includes a general purpose computing system environment, such as computing system environment 900. Computing system environment 900 may include, but is not limited to, servers, desktop computers, laptops, tablet PCs, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate debugging of a GPGPU program (e.g., attachment and detachment of a debugger to and from a GPGPU program).

Additionally, computing system environment 900 may also have additional features/functionality. For example, computing system environment 900 may also include additional storage (removable and/or non-removable) including, but not limited to, magnetic or optical disks or tape. Such additional storage is illustrated in FIG. 10 by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and nonremovable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

Computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 912 may allow computing system environment 900 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 900 may also have input device(s) 914 such as a keyboard, mouse, pen, voice input device, touch input device, remote control, etc. Output device(s) 916 such as a display, speakers, etc. may also be included. All these devices are well known in the art and are not discussed at length.

In one embodiment, computer readable storage medium 904 includes general-purpose computing on graphics processing units (GPGPU) program 906, debugging program 930, and debugging helper program 950. In one embodiment, debugging helper program 950 and the corresponding modules are incorporated into debugging program 930.

GPGPU program 906 comprises central processing unit (CPU) portion 920 and graphics processing unit (GPU) portion 922, as described herein. CPU portion 920 and GPU portion 922 may each execute as a respective one or more threads. CPU portion 920 may be operable to receive signals from debugging program 930 and debugging helper program 950, as described herein.

Debugging program 930 comprises program modification module 932, CPU attachment module 934, CPU access module 936, GPU access module 938, debugging helper communication module 940, state query module 942, user interface module 944, and execution control module 946.

Program modification module 932 is operable to modify execution of the GPGPU program. In one embodiment, program modification module 932 is operable to modify a memory stack of the CPU portion of the GPGPU program. In one exemplary embodiment, program modification module 932 is operable to add a dynamic function call to the (top of) memory stack of CPU portion 920 of the GPGPU program. CPU attachment module 934 is operable to attach to an executing CPU portion of GPGPU program 906 (e.g., to facilitate state information collection).

CPU access module 936 is operable to access CPU state information corresponding to CPU portion 920 of GPGPU program 906, as described herein. GPU access module 938 is operable to access GPU state information corresponding to GPU portion 922 of GPGPU program 906. State query module 942 is operable to send a request for state information of at least one of CPU portion 920 of GPGPU program 906 and GPU portion 922 of the GPGPU program 906. User interface module 944 is operable to display state information of the CPU portion of the GPGPU program and the GPU portion of the GPGPU program. User interface module 944 is further operable to received commands (e.g., user input) to allow debugging of GPGPU program 906.

Execution control module 946 is operable to control execution of the CPU portion 920 of GPGPU program 906 and GPU portion 922 of GPGPU program 906. In one embodiment, execution control module 946 is operable to pause execution and resume execution of CPU portion 920 of GPGPU program 906. In one exemplary embodiment, execution control module is operable to pause execution and resume execution of GPU portion 922 of GPGPU program 906.

Debugging helper communication module 940 is operable to facilitate communication with debugging helper program 950. In one embodiment, debugging helper communication module 940 is operable to send signals or messages to debugging helper program 950 for requesting state information and signaling GPGPU program 906.

Debugging helper program 950 comprises debugging program communication modules 952, CPU state information access module 954, GPU state information access module 956, and GPGPU program signaling module 958. In one embodiment, debugging helper program (or module) 950 is operable to access state information of CPU portion 920 of GPGPU program 906 via CPU state information access module 954 and state information of GPU portion 922 of GPGPU program 906 via GPU state information access module 956. Debugging program communication module 952 is operable for communicating (e.g., state information, etc.) with debugging program 930, as described herein.

Debugging helper module 950 is operable to signal, e.g., via GPGPU program signaling module 958, GPGPU program 906 to collect state information of the CPU portion of the GPGPU program. GPGPU program signaling module 958 may further be operable to be used for signaling detachment of debugging program 930 and debugging helper program 950 from GPGPU program 906, as described herein.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for debugging an executing program, said method comprising:
   executing a general-purpose computing on graphics processing units (GPGPU) program comprising a first portion operable to execute on a central processing unit (CPU) and a second portion operable to execute on a graphics processing unit (GPU);
   attaching a debugging program to said first portion of said GPGPU program, wherein said attaching pauses execution of said first portion of said GPGPU program;
   modifying said first portion of said GPGPU program;
   resuming execution of said first portion of said GPGPU program;
   accessing a first state information corresponding to said first portion of said GPGPU program; and
   accessing a second state information corresponding to said second portion of said GPGPU program based on said first state information.

2. The method as described in claim 1 further comprising:
   pausing execution of said second portion of said GPGPU program prior to accessing said second state information.

3. The method as described in claim 1 wherein said first state information is CPU state information of said first portion of said GPGPU program.

4. The method as described in claim 1 wherein said second state information is GPU state information of said second portion of said GPGPU program.

5. The method as described in claim 1 wherein said modifying comprises adding a function call to a memory stack of said first portion of said GPGPU program.

6. The method as described in claim 5 wherein said function call of said memory stack is executed in response to said resuming of execution.

7. The method as described in claim 1 further comprising:
   executing a debugging helper program, wherein said debugging helper program is operable to receive said first state information and said second state information from said GPGPU program.

8. A system comprising:
   a processor; and
   memory coupled to said processor and comprising instructions that, when executed by said processor, cause the processor to perform a method of debugging an executing program, wherein the instructions comprise:
   a CPU attachment module operable to attach to an executing CPU portion of a general-purpose computing on graphics processing units (GPGPU) program;
   a program modification module operable to modify execution of said CPU portion of said GPGPU program;
   an execution control module operable to control execution of said CPU portion of said GPGPU program and a GPU portion of said GPGPU program; and
   a GPU access module operable to access GPU state information corresponding to said GPU portion of said GPGPU program.

9. The system as described in claim 8, wherein the instructions further comprise:
   a user interface module operable to display state information of said CPU portion of said GPGPU program and said GPU portion of said GPGPU program.

10. The system as described in claim 9, wherein the instructions further comprise:
    a state query module operable to send a request for state information of at least one of said CPU portion of said GPGPU program and said GPU portion of said GPGPU program.

11. The system as described in claim 8 wherein said execution control module is operable to pause execution and resume execution of said CPU portion of said GPGPU program.

12. The system as described in claim 8 wherein said execution control module is operable to pause execution and resume execution of said GPU portion of said GPGPU program.

13. The system as described in claim 8 wherein said program modification module is operable to modify a memory stack of said CPU portion of said GPGPU program.

14. The system as described in claim 13 wherein said program modification module is operable to add a dynamic function call to said memory stack of said CPU portion of said GPGPU program.

15. The system as described in claim 8, wherein the instructions further comprise:
   a debugging helper module operable to access state information of said CPU portion of said GPGPU program and said GPU portion of said GPGPU program.

16. The system as described in claim 15 wherein said debugging helper module is operable to signal said GPGPU program to collect state information of said CPU portion of said GPGPU program.

17. A computer implemented method for debugging a general-purpose computing on graphics processing units (GPGPU) program, said method comprising:
   receiving a request to detach a debugging program from said GPGPU program, wherein a first portion of said GPGPU program executed in a central processing unit (CPU), wherein a second portion of a said GPGPU is executed on a graphics processing unit (GPU), and wherein said debugging program is attached to said first portion and configured to modify said first portion;
   sending a signal to said GPGPU program;
   resuming execution of said GPGPU program; and
   in response to said signal said GPGPU program closes a communication channel with a debugging application.

18. The computer implemented method as described in claim 17 further comprising:
   in response to said request to detach, sending a message to a debugging helper program.

19. The computer implemented method as described in claim 17 wherein said signal is sent to a CPU portion of said GPGPU program.

20. The computer implemented method as described in claim 17 wherein said sending of said signal is performed by a debugging helper program.

* * * * *